United States Patent [19]

Sato

[11] Patent Number: 5,746,556
[45] Date of Patent: May 5, 1998

[54] ANCHOR UNIT WITH EXPANSIVE ANCHOR MEMBER EXPANDED BY UTILIZING TURNING FORCE OF BOLT

[75] Inventor: Yoshinori Sato, Tokyo, Japan

[73] Assignee: Kabushiki Kaisha Youma Kohboh, Tokyo, Japan

[21] Appl. No.: 612,984

[22] Filed: Mar. 6, 1996

[30] Foreign Application Priority Data

| Mar. 13, 1995 | [JP] | Japan | 7-052158 |
| Jun. 29, 1995 | [JP] | Japan | 7-163229 |
| Aug. 2, 1995 | [JP] | Japan | 7-197297 |
| Jan. 19, 1996 | [JP] | Japan | 8-006992 |

[51] Int. Cl.$^6$ ............................................. F16B 13/06
[52] U.S. Cl. .......................... 411/42; 411/5; 411/40; 411/55
[58] Field of Search .......................... 411/40–46, 49–53, 411/55, 39, 14, 9, 8, 5

[56] References Cited

U.S. PATENT DOCUMENTS

| 1,234,176 | 7/1917 | Kennedy | 411/44 |
| 2,088,358 | 7/1937 | Adams | 411/44 |
| 2,625,071 | 1/1953 | Lewis | 411/53 |
| 3,834,269 | 9/1974 | Ohringer | 411/9 |
| 4,340,330 | 7/1982 | Reidel | 411/18 |
| 4,391,559 | 7/1983 | Mizusawa | 411/45 |
| 4,402,637 | 9/1983 | Seghezzi | 411/44 |
| 4,498,825 | 2/1985 | Pamer | 411/14 |
| 4,653,132 | 3/1987 | Yamada | 411/45 |
| 4,772,167 | 9/1988 | Beals | 411/43 |
| 4,968,199 | 11/1990 | Haage | 411/39 |
| 5,017,067 | 5/1991 | Ohlin | 411/45 |
| 5,161,916 | 11/1992 | White | 411/40 |
| 5,181,816 | 1/1993 | Walsh | 411/45 |
| 5,333,977 | 8/1994 | Sugawara | 411/51 |
| 5,370,483 | 12/1994 | Hood | 411/14 |
| 5,437,525 | 8/1995 | Bras | 411/14 |

FOREIGN PATENT DOCUMENTS

| 0306681 | 3/1989 | European Pat. Off. |
| 0612924 | 8/1994 | European Pat. Off. |
| 3006480 | 8/1981 | Germany. |
| 59-147110 | 8/1984 | Japan. |
| 62-18413 | 2/1987 | Japan. |
| 6116953 | 4/1994 | Japan. |
| 6330525 | 11/1994 | Japan. |
| 586356 | 3/1977 | Switzerland. |
| 1345044 | 1/1974 | United Kingdom. |
| 2097503 | 11/1982 | United Kingdom | 411/39 |

*Primary Examiner*—Steven N. Meyers
*Assistant Examiner*—Gary Estremsky

[57] ABSTRACT

Anchor unit of this invention is provided with a plug which is driven into an anchor socket or sleeve to expand its split end portion by rotating a bolt which is engaged with the anchor socket or the plug by threads, in a predetermined direction. In one embodiment, the plug is a separable end portion of the bolt which is movable together with a remaining portion of the bolt when the bolt is rotated in the above described predetermined direction and twisted off or separated from the remaining portion when the bolt is rotated in a direction opposite to the above described predetermined direction.

17 Claims, 20 Drawing Sheets

ANCHOR UNIT WITH EXPANSIVE ANCHOR MEMBER EXPANDED BY UTILIZING TURNING FORCE OF BOLT

BACKGROUND OF THE INVENTION

1. Field of the Invention

The present invention relates to an anchor unit for use in, for example, hanging a picture or the like from a wall of a structure or attaching to the wall a hardware or metallic part for preventing a furniture or the like from falling.

2. Description of the Related Art

A number of this kind of metallic parts for anchoring have heretofore been proposed. For example, an anchor unit disclosed in Japanese utility model provisional publication No. 62-18413, has an anchor sleeve having a split end in which a plug of a truncated cone shape is held. The anchor sleeve is driven into a hole together with the plug by means of a special tool. At the bottom of the hole, the plug stops moving and spreads or expands the split end of the anchor sleeve radially outwards. By this, the anchor socket is held fast in the hole. Then, a bolt is screwed into the sleeve to be held or supported thereby. Similar anchor units are disclosed in Japanese patent provisional publication Nos. 6-330525 and 6-116953.

Further, an anchor disclosed in Japanese patent provisional publication No. 59-147110, has an anchor sleeve having a split end portion. The split end portion has a conical or tapered inner periphery. An insert or plug is pushed into the anchor sleeve and driven toward the bottom of a hole in which the sleeve is installed. By this, the split end portion is spread or expanded so that the sleeve is held fast in the hole. A similar anchor unit is disclosed in Japanese utility model provisional publication No. 5-94333.

However, in the case where the sleeve and the plug are driven into a hole by beating or striking for expanding the split end portion of the sleeve within the hole, e.g., in the case of installation or attachment of a metallic part for hanging a picture from a wall of a structure or a metallic part for preventing a furniture from falling, there is a possibility that damage or breakage of the wall or of a facing disposed apart from the wall or peeling of a wallpaper is liable to be caused, and great shocks, vibrations and noises are caused to give annoyance to the neighbors. Further, in the case where a sleeve and a plug are driven into a hole formed in a ceiling by beating or striking for expanding the sleeve for the purpose of attachment of a saddle or the like which is used for attachment or installation of feed and waste pipes, pipes for an air conditioning system, wiring, etc. in the ceiling, the work for such beating or striking with a hammer must be done by a worker facing upward, causing a problem that the efficiency of the work is deteriorated considerably and the sleeve is liable to be driven excessively into the hole to cause an irregularity in attachment and a defective finish.

The sleeve of the kind adapted to expand by hammering requires that the hole formed in the wall be accurate in depth. If the hole is too deep, a desired pull-out strength cannot be obtained, and it is impossible to ascertain the strength of attachment. Further, if the hole is not accurate in depth, there is caused an irregularity of the length by which the sleeve protrudes outward from the wall, and therefore a deteriorated appearance results.

When the sleeve is to be driven into the wall, a special tool made up of a driving rod having a head portion for pushing the sleeve into the hole, is necessitated, which is inconvenient since expansion of the sleeve cannot be attained without such a special tool.

The prior art anchor units of the type described above, require three or more parts and have a difficulty in reducing the number of constituent parts thereof and therefore the manufacturing cost.

Further, the prior art anchor units of the above described type have no means for assuredly checking or ascertaining whether the end of the sleeve is expanded completely or desiredly and therefore have a possibility that the sleeve is not held fast to the wall or ceiling and easily pulled off from same when the bolt screwed in such a sleeve is subjected to a load.

SUMMARY OF THE INVENTION

According to an aspect of the present invention, there is provided an anchor unit which comprises a tubular anchor member having a split end portion, the split end portion having a tapered hole, a bolt driven into the tubular anchor member to be supported thereby, plug means for expanding the split end portion in cooperation with the tapered hole when receiving a driving force, and thread means for transmitting the driving force from the bolt to the plug means by means of threads when the bolt is driven into the tubular anchor member.

According to another aspect of the present invention, there is provided an anchor unit which comprises an anchor socket having a threaded hole, an external projection at a peripheral portion around the threaded hole, and a split end portion having a plurality of slits and a tapered hole connected with the threaded hole, and a bolt having at an end a separable plug portion and a threaded portion engaged with the threaded hole of the anchor socket, the plug portion being capable of expanding the split end portion in cooperation with the tapered hole, the bolt further having separable joining means for allowing the plug portion to be movable with a remaining part of the bolt so as to be driven into the split end portion for cooperation with the tapered hole when the bolt is rotated in a first direction to be screwed into the anchor socket and to be separated from the remaining portion of the bolt and left behind within the split end portion when the bolt is rotated in a second direction opposite to the first direction.

According to another aspect of the present invention, the bolt has an annular groove between the plug portion and the threaded portion, the plug portion having a ratchet so as to be slidable on the tapered hole when the bolt is rotated in the first direction and engageable in the slits so as to be incapable of rotating together with the remaining portion of the bolt when the bolt is rotated in the second direction, the separable joining means being constituted by the annular groove and the ratchet for enabling the plug portion to be twisted off from the remaining portion of the bolt through twisting of the bolt in the second direction.

According to a further aspect of the present invention, the plug portion and the remaining portion of the bolt are independent from each other and drivingly connected at mating ends thereof in such a manner as to enable the plug portion to rotate together with the remaining portion of the bolt when the remaining portion of the bolt is rotated in the first direction and to be separated from the remaining portion of the bolt when the remaining portion of the bolt is rotated in the second direction, the separable joining means being constituted by the mating ends of the plug portion and the remaining portion of the bolt.

According to a further aspect of the present invention, there is provided an anchor unit which comprises an anchor sleeve having a split end portion having a plurality of slits and a tapered inner periphery, and an external projection at a portion excluding the split end portion, a plug having a threaded hole and a plurality of external projections engaged in the slits of the split end portion of the anchor sleeve so as to prevent the plug from rotating relative to the anchor sleeve, the plug being capable of expanding the split end portion of the anchor sleeve in cooperation with the tapered inner periphery when driven into the anchor sleeve, and a bolt inserted into the anchor sleeve and screwed into the plug, the bolt being capable of driving the plug into the split end portion of the anchor sleeve when the bolt is rotated in a predetermined direction.

The above structure is effective for solving the above noted problem inherent in the prior art device.

It is accordingly an object of the present invention to provide a novel and improved anchor unit whose attachment or installation can be attained by a turning force or torque applied thereto without requiring such a large striking force that causes a large striking noise and large shocks and vibrations that are annoyance to the neighbors.

It is a further object of the present invention to provide a novel and improved anchor unit of the above described character whose attachment or installation can be attained by a quiet work.

It is a further object of the present invention to provide a novel and improved anchor unit of the above described character whose attachment and installation can be attained with least possibility of damaging a wall of a structure or the like in which it is installed.

It is a further object of the present invention to provide a novel and improved anchor unit of the above described character which is particularly suited for use in being connected with a metallic part for hanging a painting or the like from a wall or for preventing a furniture, a business machine such as a computer, or the like from falling within a structure.

DETAILED DESCRIPTION OF THE PREFERRED EMBODIMENTS

Referring to FIGS. 1 to 5, an anchor unit according to an embodiment of the present invention is made up of an anchor socket 1 and a bolt 2. The bolt 2 is adapted to be screwed into the anchor socket 1.

Figure 2A:
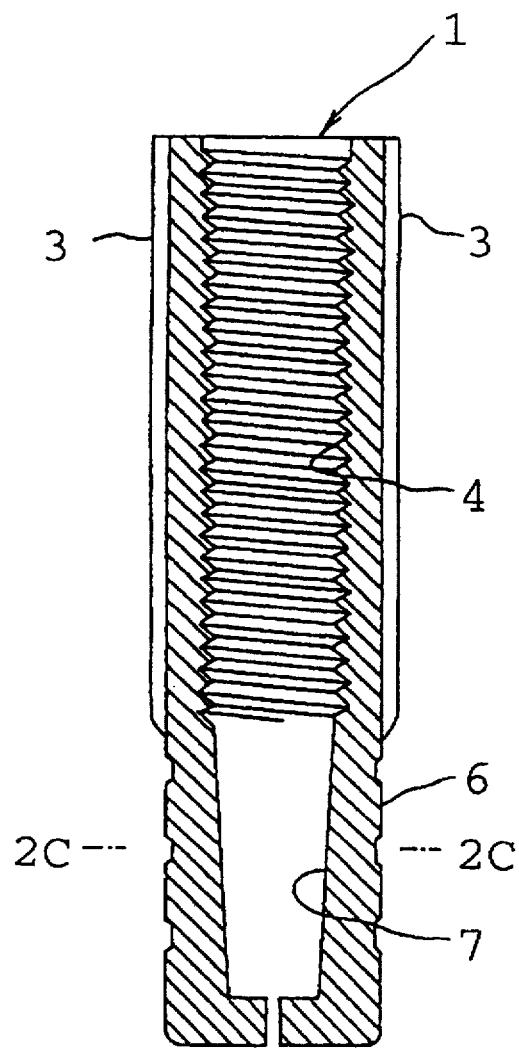
FIG. 2A is a longitudinal sectional view of an anchor socket which is a constituent part of the anchor unit of FIG. 1.
Figure 2B:
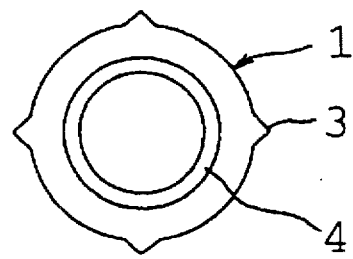
FIG. 2B is a top plan view of the anchor socket of FIG. 2A.
Figure 2C:
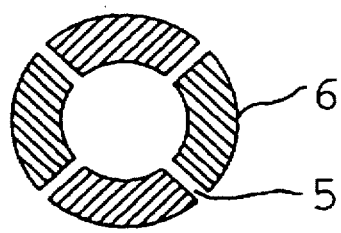
FIG. 2C is a sectional view taken along line 2C—2C in FIG. 2A.
Figure 2D:
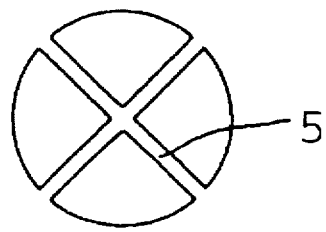
FIG. 2D is a bottom plan view of the anchor socket of FIG. 2A.

As seen from FIGS. 2A and 2B, the anchor socket 1 is hollow and generally cylindrical and is open at an end and generally closed at the other end. The anchor socket 1 has a plurality of external ribs 3 and a threaded hole 4 at a main portion thereof including the open end. The ribs 3 are elongated axially and straightly and disposed in a circular array with equal intervals in such a way as to surround the threaded hole 4. The anchor socket 1 has a plurality of slots or slits 5 of a predetermined length at an end portion including the generally closed end, i.e., the anchor socket 1 has a split end portion 6 which is located next to the main portion formed with the ribs 3 and the threaded hole 4. The split end portion 6 has a rugged or undulated outer periphery or circumferential surface consisting of alternate larger diameter convex sections and smaller diameter concave sections. Further, the split end portion 6 has a conical or tapered inner periphery or hole 7. The split end portion 6 is constructed so as to be capable of expanding radially outward by the effect of the slits 5 and biting into an inner wall of a hole in which the anchor socket 1 is installed.

Figure 3A:
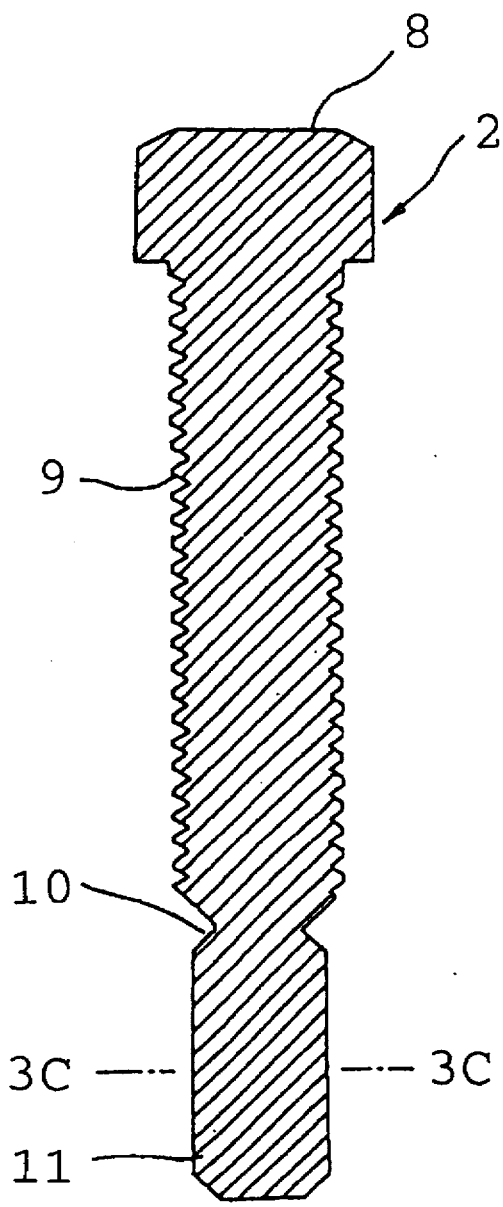
FIG. 3A is a sectional view of a bolt which is a constituent part of the anchor unit of FIG. 1.
Figure 3B:
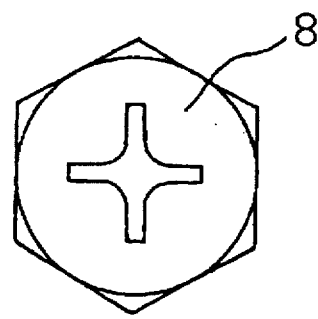
FIG. 3B is a top plan view of the bolt of FIG. 3A.

The bolt 2 has such a length that it can be screwed completely into the anchor socket 1. The bolt 2 has a hexagonal bolt head 8 at an end, a threaded portion 9, a ring-shaped or annular groove 10 and a plug portion 11 at the other end as shown in FIGS. 3A and 3B. The threaded portion 9 is located between the bolt head 8 and the plug portion 11. The annular groove 10 is located between the threaded portion 9 and the plug portion 11. The plug portion 11 is separable from the threaded portion 9 by the effect of the annular groove 10 and is not threaded but formed with a ratchet 12.

The ratchet 12 does not engage in the slits 5 when the bolt 2 is turned or rotated in the first direction to be screwed into the anchor socket 1 but can engage in the slits 5 to prevent rotation of the bolt 2 when the bolt 2 is driven in the second direction opposite to the first direction. The bolt 2 has at a portion formed with the annular groove 10 such a predetermined sectional area or diameter that enables the plug portion 11 to be twisted off at the time of rotation of the bolt 2 in the second direction whilst enabling the plug portion 11 to move into a deepest part of the anchor socket 1 at the time of rotation of the bolt 2 in the first direction.

Referring to FIGS. 4 and 5A to 5D, it will be described hereinlater how the anchor unit of this invention is installed on or attached to a wall of a structure.

Figure 4:
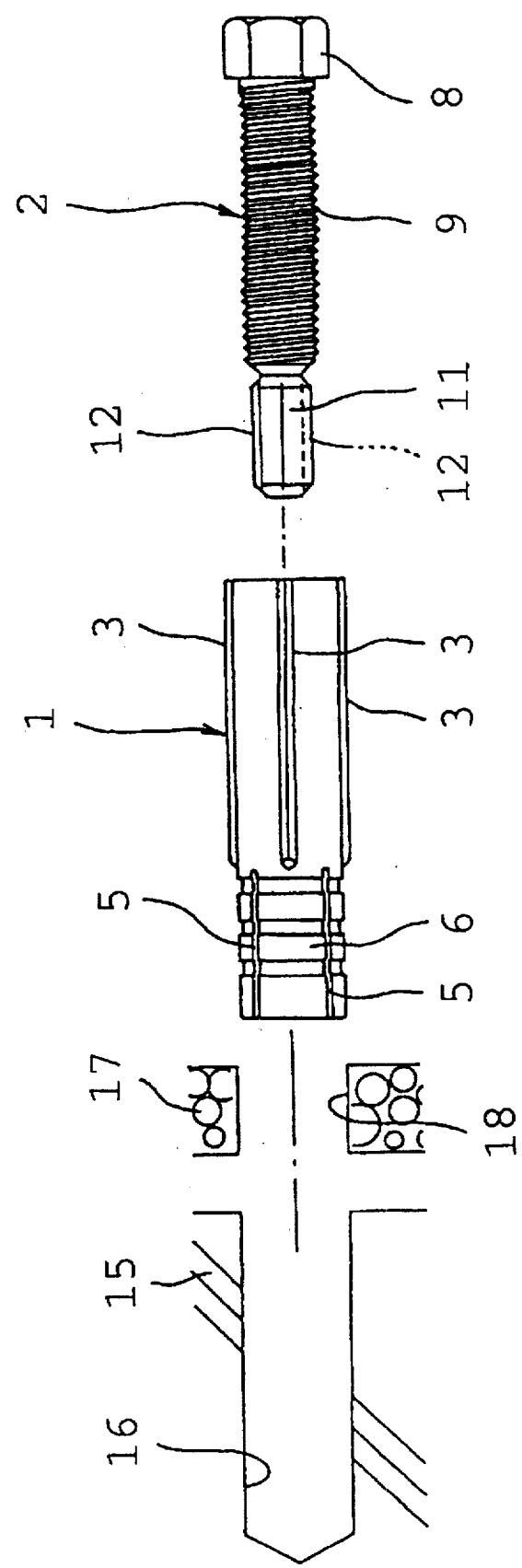
FIG. 4 is an exploded view of the anchor unit of FIG. 1 and shows how the anchor unit is installed or attached to a wall.
Figure 5A:
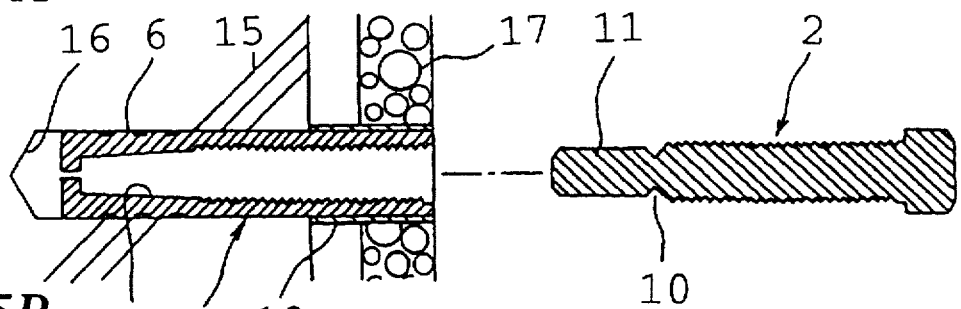
FIG. 5A to 5D are sectional views for illustrations of attaching or installing processes of the anchor unit of FIG. 1.

Firstly, holes 16 and 18 for receiving therewithin the socket 1 are drilled or otherwise formed in a wall 15 of a structure and a facing 17 spaced apart from the wall 15, as shown in FIG. 4. The anchor socket 1 is beaten or struck softly with a hammer or the like, so as to be inserted into the hole 16 as shown in FIG. 5A. In this instance, it is desirable that a sleeve 19 is fitted in the hole 18. The anchor socket 1 is placed so as not to protrude outward from the outer side surface of the facing 17.

Figure 5B:
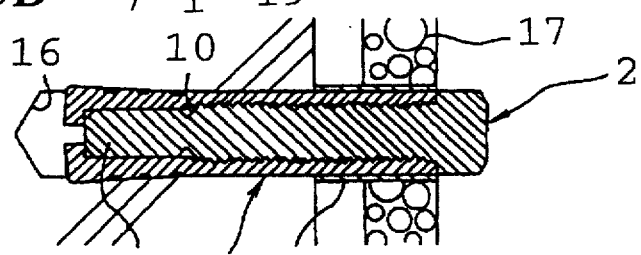
Figure 5C:
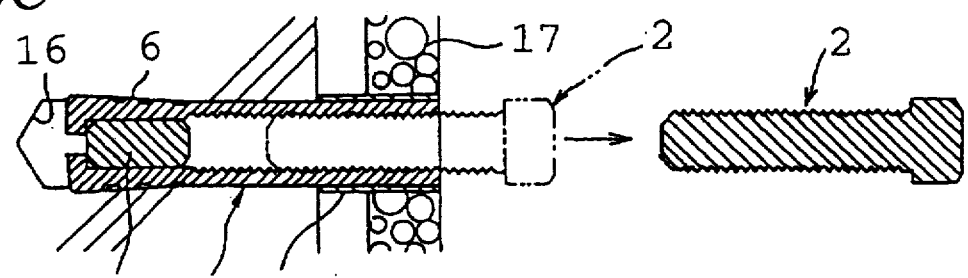
Figure 5D:
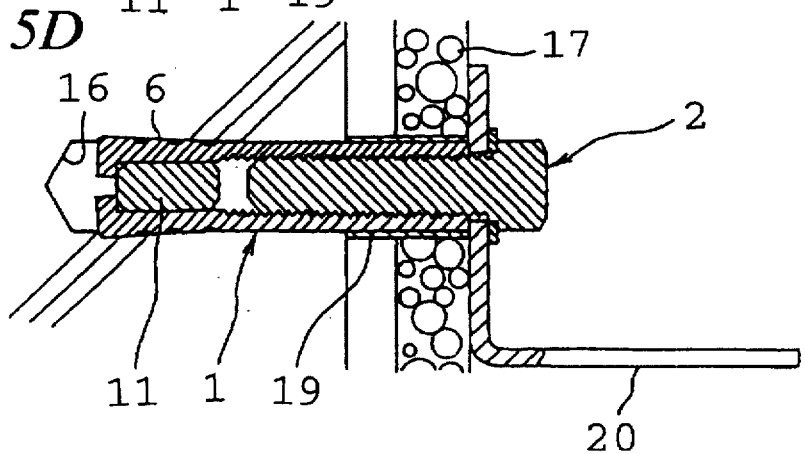
Figure 6A:
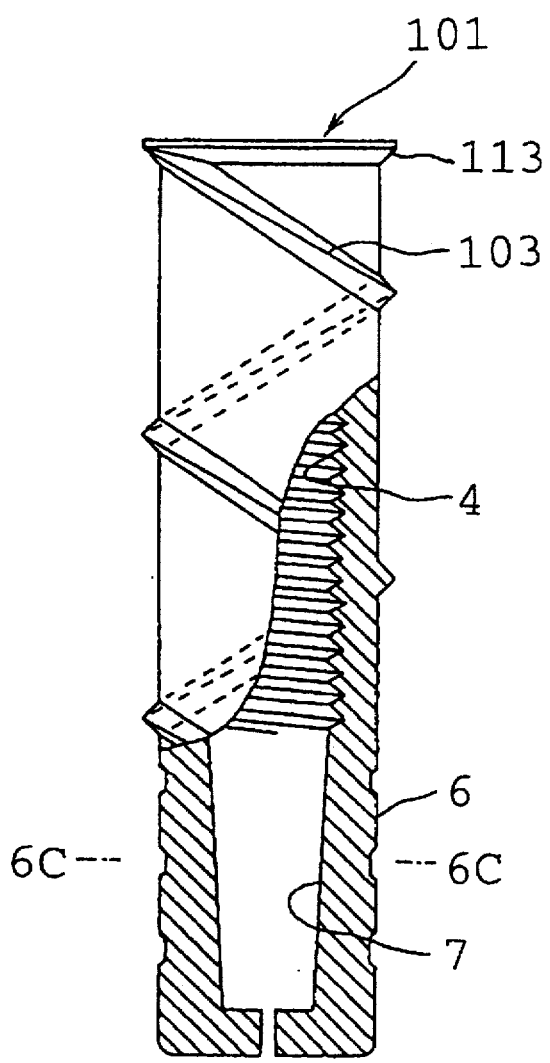
FIG. 6A is an elevational, partly sectioned view of a variant of the anchor socket for use in the anchor unit of FIG. 1.
Figure 6B:
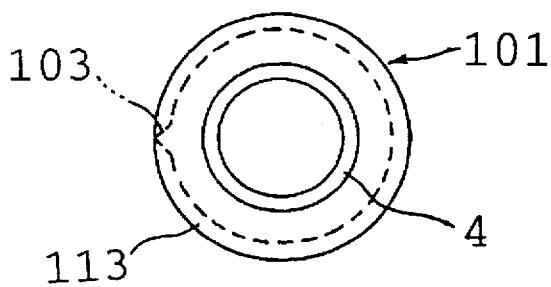
FIG. 6B is a top plan view of the anchor socket of FIG. 6A.
Figure 6C:
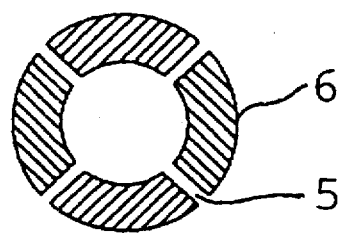
FIG. 6C is a sectional view taken along line 6C—6C in FIG. 6A.
Figure 6D:
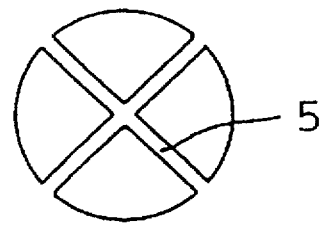
FIG. 6D is a bottom plan view of the anchor unit of FIG. 6A.

When the bolt 2 is driven in the above described second direction so as to be screwed into the anchor socket 1, the ribs 3 are cause to bite into the inner circumferential wall of the hole 16, i.e., a portion of the wall 15 defining the hole 16, and prevent the anchor socket 1 from rotating together with the bolt 2, whilst the ratchet 12 are caused to slide over the slits 15 without biting thereinto or engaging therein, thus making it possible for the bolt 2 to be screwed completely or desiredly into the anchor socket 1 as shown in FIG. 5B.

When the plug portion 11 gets to the split end portion 6 as shown in FIG. 5B, the split end portion 6 is expanded against the inner circumferential wall of the hole 16 by the effect of the tapered hole 7 and is caused to bite into the inner circumferential wall of the hole 16, i.e., a portion of the wall 15 defining the hole 16. Then, the bolt 2 is driven in the reverse direction, i.e., in the above described second direction. By this, the ratchet 12 is engaged in the slits 5 to prevent rotation of the plug portion 11. Under this condition, the bolt 2 is driven or twisted further in the reverse direction, whereby the plug portion 11 is twisted off or cut off from the remaining part of the bolt 2 by the effect of the annular groove 10. The bolt 2 is removed from the anchor socket 1 whilst allowing the plug portion 11 to be left behind within the split end portion 6.

Accordingly, the anchor socket 16 is held firmly or fast in the hole 16 and assuredly prevented from falling off or coming out therefrom, so by installing an angle rod 20 to the detached bolt 2 and screwing the bolt 2 once again into the anchor socket 1, a hanging-up-on-the-wall type support structure having a good appearance and a sufficient strength can be obtained without damaging the facing 17. The support structure can be connected with a furniture or the like to serve as a means for preventing the furniture from falling at earthquake or can be used as a means for hanging a picture on the wall. In the meantime, the angle member 20 can be installed on the bolt 2 from the first so that it is not necessary to detach the bolt 2 once from the anchor socket 1.

From the foregoing, it will be understood that the anchor unit of this invention is made up of only two parts, i.e., the anchor socket 1 and the bolt 2. The plug portion 11 can be left behind within the anchor socket 1 by driving or twisting the bolt 1 in the reverse direction, i.e., in the direction to cause the bolt 2 to be detached from the socket 1, so the anchor socket 1 can be installed on or attached to the wall 15 with ease and without causing large shocks, vibrations and noises that will inevitably give annoyance to the neighbors. Further, attachment and detachment of the bolt 2 can be attained with ease and therefore change of the angle member 20, etc. can be attained with ease.

While the anchor unit of this invention has been described and shown by way of example as being of the kind that is embedded in the wall 15 having the facing 17, this is not for the purpose of limitation but it can, for example, be used as an anchor for connection between various members in a concrete building or structure, etc.

FIGS. 6A to 6D show a variant of the above described anchor socket 1. In this variant, an anchor socket 101 has a spiral rib 103. The spiral rib 103 may be either right-handed or left-handed. Further, the anchor socket 101 has a flange 113 at the open end, i.e., at the end opposite to the split end portion 6, through which the bolt 2 is screwed thereinto. Except for the above, this variant is substantially the same as that of the previous embodiment of FIG. 1.

By the spiral rib 103, the anchor socket 101 is fitted in the hole 16 whilst rotating in a predetermined direction (refer to FIG. 5A), whereby it becomes possible to increase the strength of joining between the anchor socket 1 and the wall 15. Further, the flange 113 can serve as a stopper for preventing the anchor socket 1 from being driven excessively into the wall 15, improve the appearance of the open end of the hole 16 and is effective for preventing water from intruding through the hole 16 into the inside of a room or the like.

While the rib 3 or 103 is shown as having a nearly triangular cross section, it is not limited to such a sectional shape but can be another polygonal cross section, i.e., can be any sectional shape, provided that it does not cause any obstruction to driving of the anchor socket 1 or 101 into the wall 15 and can increase the strength of joining between the anchor socket 1 or 101 and the wall 15. Further, the rib 3 or 103 is not necessarily continuous in the longitudinal direction of the anchor sleeve 1 but can be discontinuous, e.g., can be a single or plurality of projections having a conical shape or in the form of a pyramid, or the like.

Figure 7A:
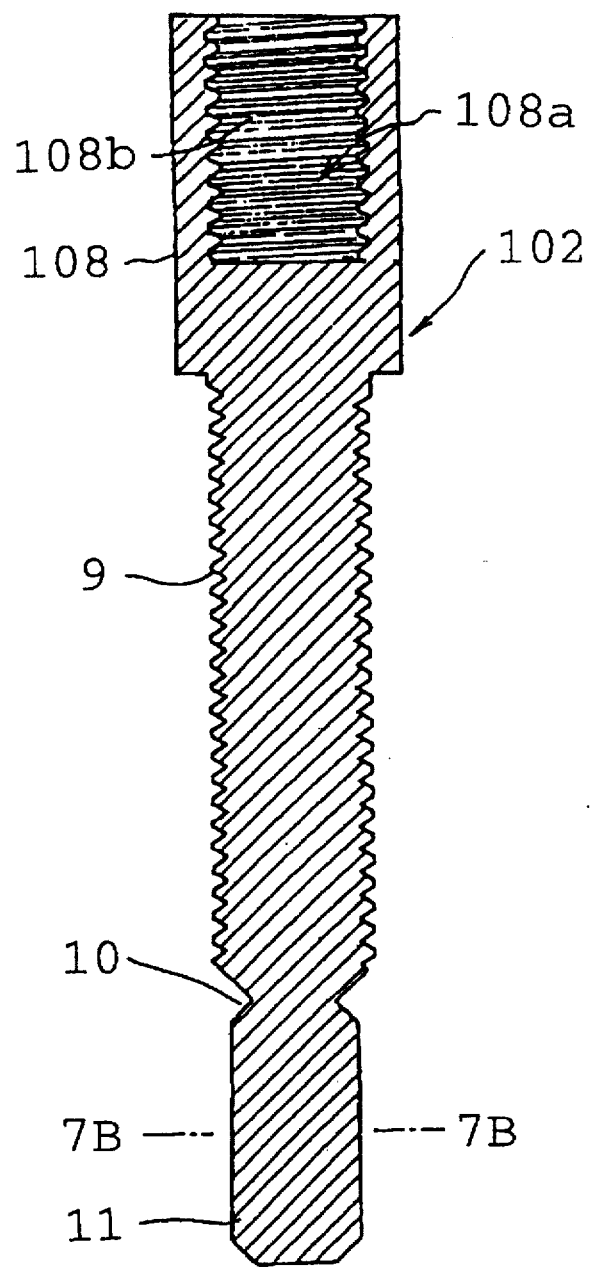
FIG. 7A is a sectional view of a variant of the bolt for use in the anchor unit of FIG. 1.
Figure 7B:
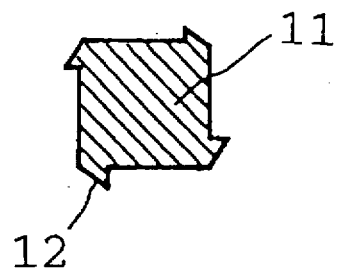
FIG. 7B is a sectional view taken along line 7B—7B in FIG. 7A.
Figure 7C:
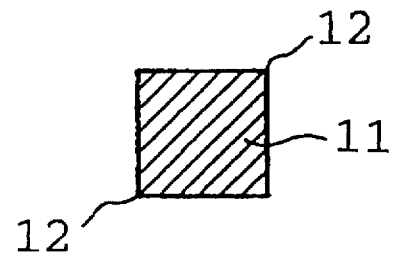
FIG. 7C is a view similar to FIG. 7B but shows a variant of the bolt of FIG. 7A.
Figure 7D:
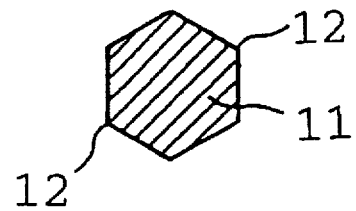
FIG. 7D is a view similar to FIG. 7B but shows another variant.

FIGS. 7A and 7B show a variant of the bolt 2. In this variant, the head 108 of the bolt 102 can be formed with a recess 108a having a threaded inner circumferential wall 108b. Such a bolt 102 can be used for hanging an angle bar for supporting thereon a wiring or pipes in a ceiling. To this end, the above described anchor sockets 1 are inserted into a pair of holes formed in the ceiling so as to be spaced apart a predetermined distance. Each bolt 102 is screwed completely into the anchor socket 1 so that the plug portion 11 is placed in the deepest part of the anchor socket 1. Thereafter, each bolt 102 is twisted in the reverse direction, i.e., in the above described second direction, for thereby making the plug portion 11 be left behind within the anchor socket 1 and the anchor socket 1 be held fast to the ceiling. Then, a hanging bolt (not shown) is screwed into the recess 108a of each bolt 102. An angle bar is attached to a pair of hanging bolts so as to be held horizontally thereby. As shown in FIGS. 7C and 7D, the plug portion 11 can have such polygonal sectional shapes, i.e., a square sectional shape and a hexagonal sectional shape. In this connection, the apex portions or corner portions 12 are formed into such a ratchet shape shown in FIG. 7B during the time when the plug portion 11 is rotated in the first direction and pushed into the deepest part of the anchor socket 1 due to rubbing or contact between the plug portion 11 of the bolt 2 and the tapered hole 7 of the split end portion 6 of the anchor socket 102. Further, in the case where removal of the bolt 2 or 102 is not necessitated after the bolt 2 or 102 is screwed into the anchor socket 1 or 101 to expand the same for attachment or installation of something, the plug portion 11 can have a circular cross section since it is not necessary to be twisted off from the remaining portion of the bolt 2 after expansion of the split end portion 6 of the anchor socket 1.

Figure 8A:
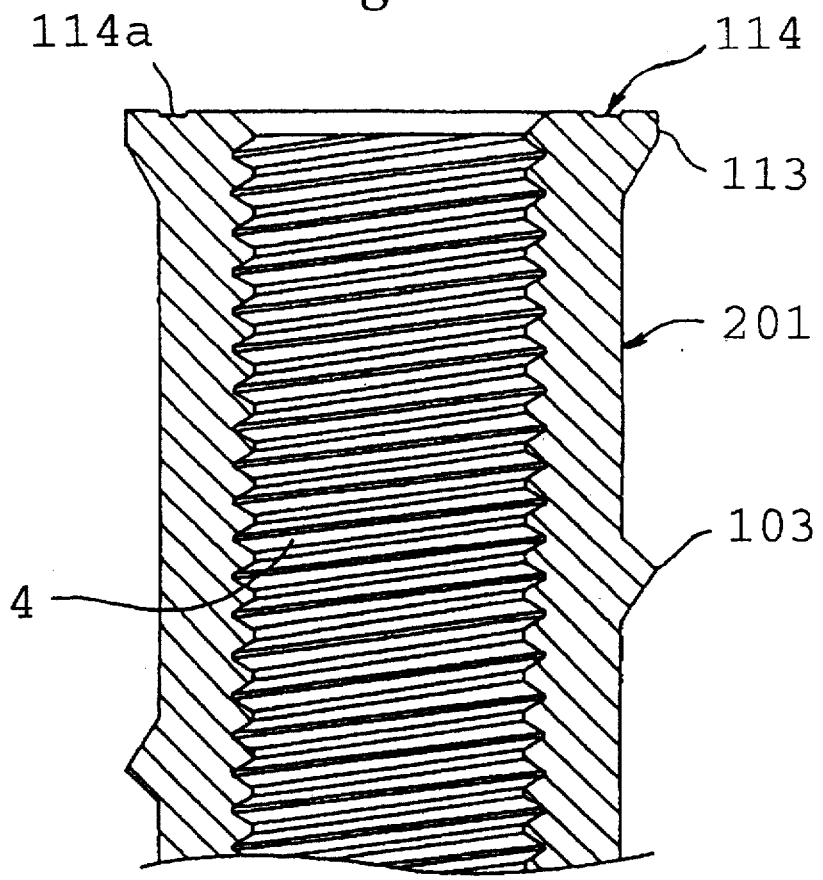
FIG. 8A is an enlarged, fragmentary sectional view of an anchor socket of an anchor unit according to another embodiment of the present invention.
Figure 8B:
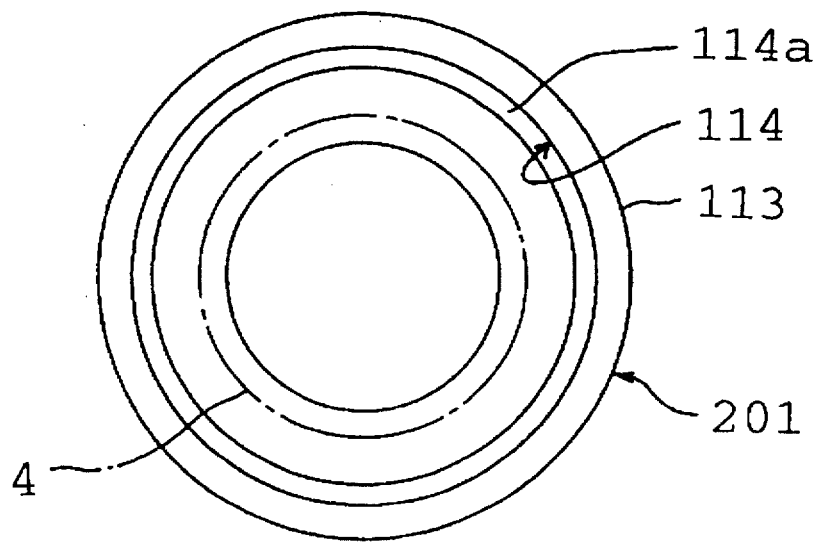
FIG. 8B is a top plan view of the anchor socket of FIG. 8A.
Figure 9A:
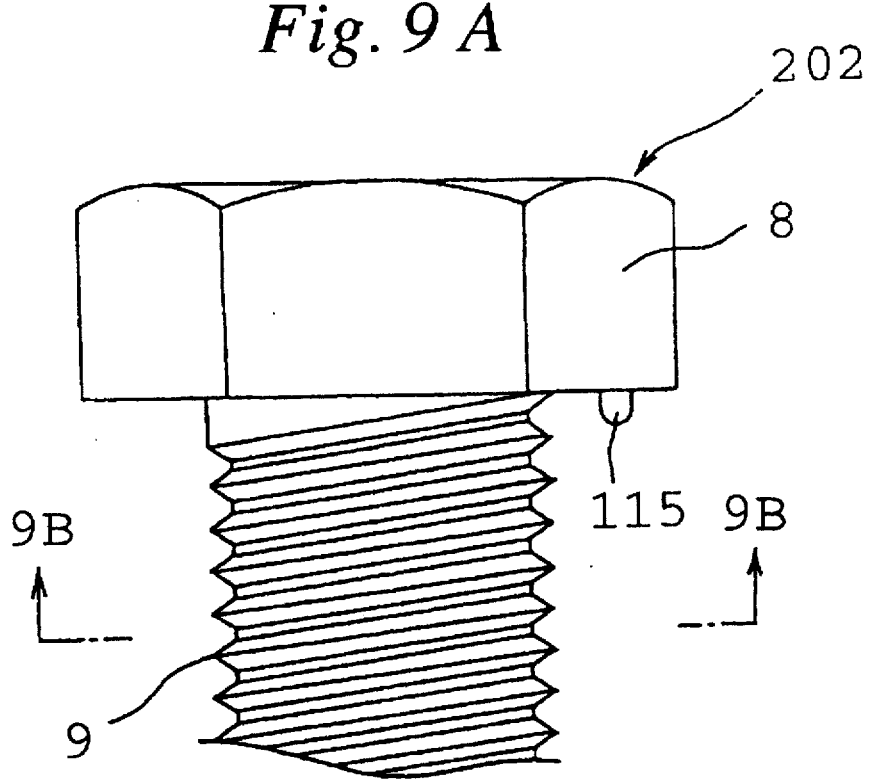
FIG. 9A is an enlarged, fragmentary elevational view of a bolt for use with the anchor socket of FIG. 8A.
Figure 9B:
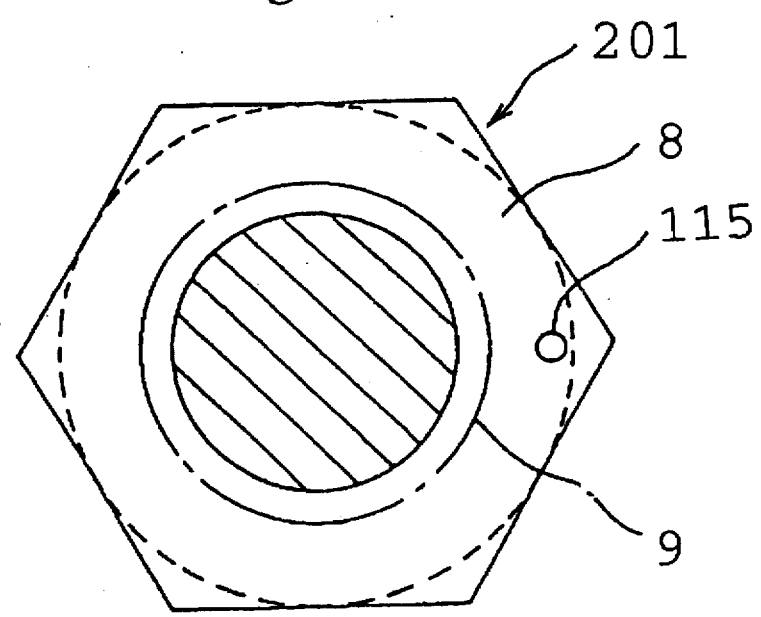
FIG. 9B is a sectional view taken along line 9B—9B in FIG. 9A.
Figure 10:
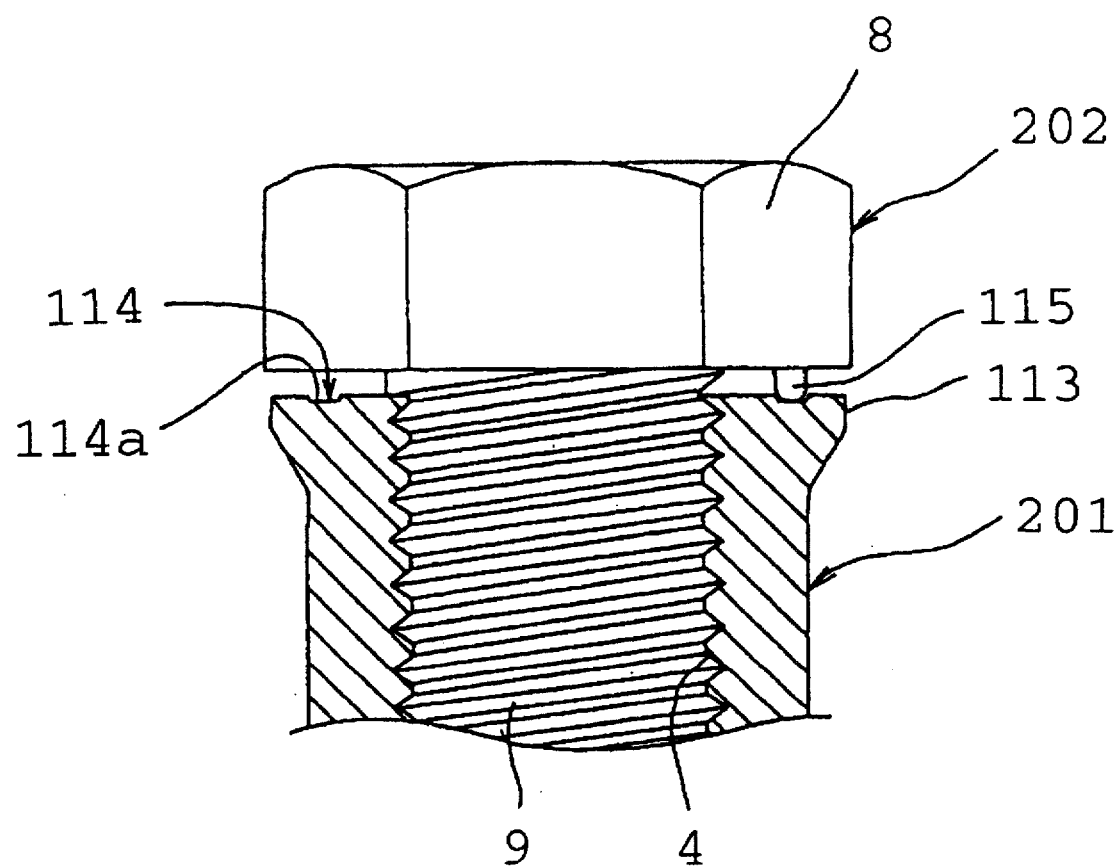
FIG. 10 is a fragmentary sectional view of the anchor socket of FIG. 8A and the bolt of FIG. 9A for illustration of the operation thereof.

FIGS. 8 to 10 show another embodiment. In this embodiment, as shown in FIGS. 8A and 8B, the anchor socket 201 has a flange 113 similarly to the variant of FIGS. 6A and 6B, and a ring-shape or annular groove or recess 114 at the end surface of the flange 113. On the other hand, as shown in FIGS. 9A and 9B, the head 8 of the bolt 202 has an integral projection 115 for engagement in the annular groove 114 at the flange 113 of the anchor socket 201. The projection 115 has such a height or length that allows a free end thereof to be brought into contact with the bottom surface 114a of the annular groove 114 when the bolt 201 is screwed a predetermined amount into the anchor socket 201, i.e., the plug portion 11 of the bolt 201 gets to a predetermined position within the anchor socket 201. Accordingly, when the bolt 202 is screwed completely or in a desired manner into the anchor socket 201 to cause the split end portion 6 to expand completely, the projection 115 is brought into contact with the bottom 114a of the groove 114 as shown in FIG. 10 and makes a mark thereon. Thus, by detaching the bolt 202 from the anchor socket 201 and observing whether a mark is formed on the bottom 114a of the groove 114, it can be determined whether the split end portion 6 is completely expanded or not, and therefore it can be determined how much the bolt 202 is screwed into the anchor socket 201. In the meantime, two or more of such projections 115 may be provided to the bolt head 8 if necessary. The anchor socket 201 has a spiral rib 103 similarly to the variant of FIGS. 6A and 6B. Except for the above, this embodiment is substantially similar to the previous embodiment of FIGS. 1 to 3.

Figure 11:
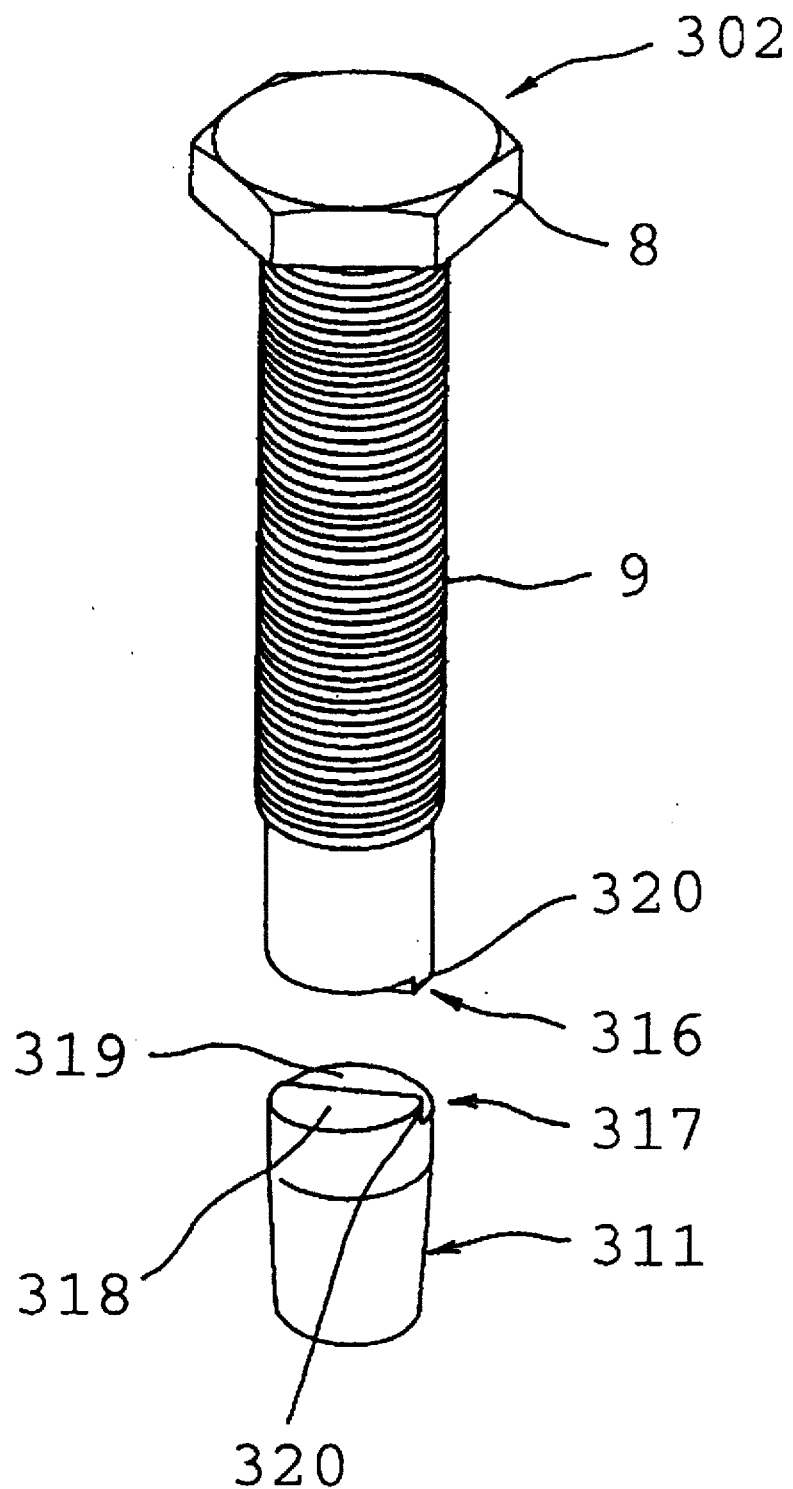
FIG. 11 is a perspective view of a variant of the bolt for use in the anchor unit of FIG. 1.

FIGS. 11 and 12 show a further variant of the bolt 2. In this variant, a bolt 302 has a separated or independent plug portion 311 which is separated from a remaining portion having the bolt head 8 and the threaded portion 9 in order to dispense with the work for applying a torque to the bolt for twisting off the plug portion 311 as shown in FIG. 11. The plug portion 311 has a conic shape and a conic or tapered peripheral surface which is brought into contact with the tapered hole 7 of the anchor socket 1 to expand the split end portion 6.

Figure 12A:
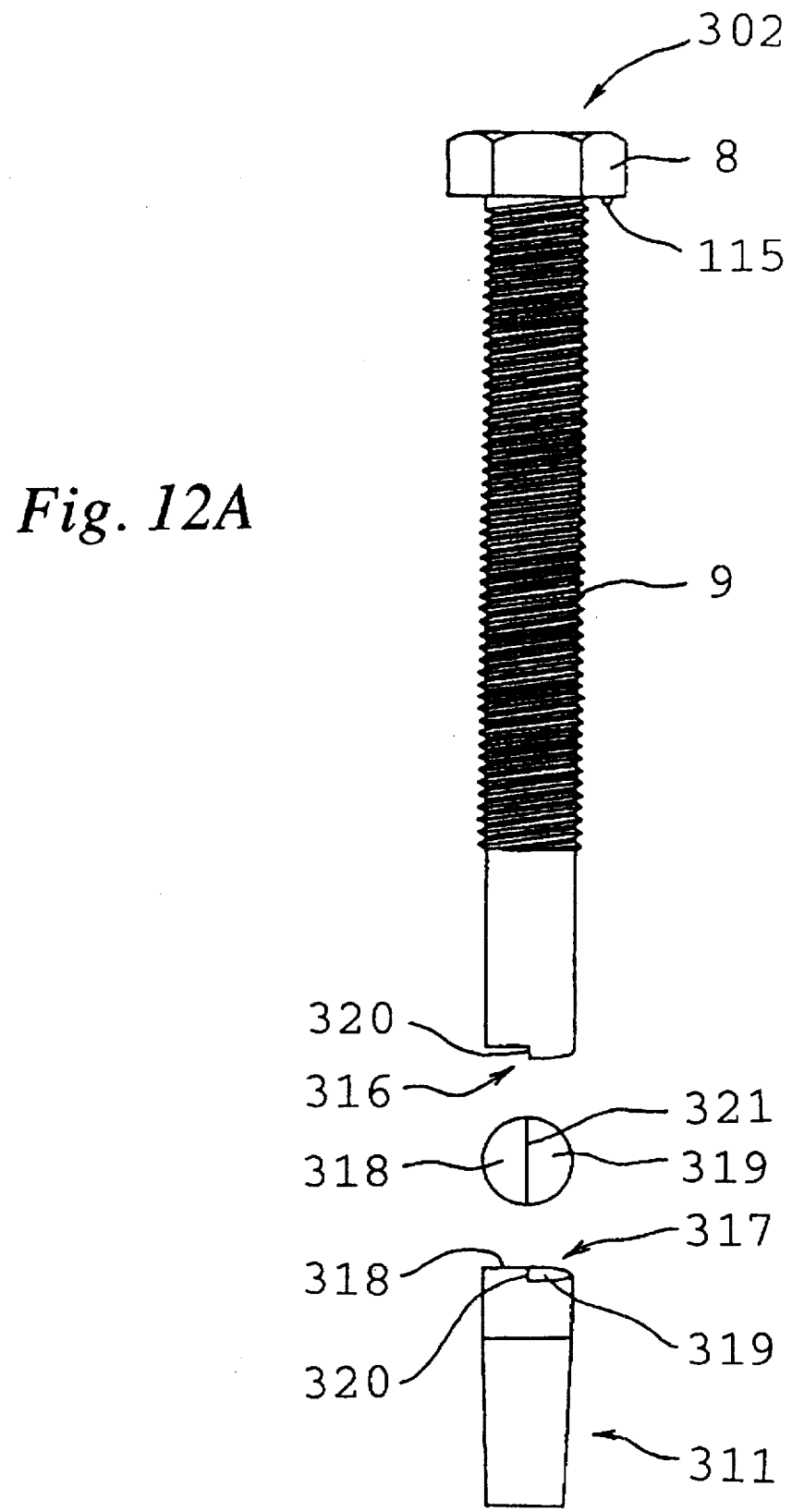
FIG. 12A is a view showing a main portion of the bolt, an end of the bolt and a plug portion of the bolt.

In this instance, the plug portion 311 and the remaining portion of the bolt 302 have mating ends 316 and 317. Each of the mating ends 316 and 317 has a stepped end face, that is, as shown in FIG. 12A, the face of the mating end 316 consists of a semicircular flat or planar section 318 which is perpendicular to the center axis of the bolt 302, and a helically inclined semicircular section 319, i.e. a surface section twisted oblique to the center axis of the bolt 302. A shoulder 320 is formed along a center line 321 between the planar semicircular section 318 and the inclined semicircular section 319 when viewed in a plan view as shown in FIG. 12A. The mating end 317 is shaped correspondingly to the mating end 316.

Accordingly, when the mating ends 316 and 317 are abutted upon each other, the flat surface sections 318 and the inclined surface sections 319 of the both are fittingly joined with each other without any space therebetween, whereby the plug portion 311 and the bolt head side portion of the bolt 302 are movable together as a unit. Thus, when the bolt 302 is rotated or driven in the first direction, i.e., in the direction to be screwed into the anchor socket 1, the plug portion 311 is caused to rotate in the first direction together with the remaining portion of the bolt 302. When the bolt 302 is driven in the reverse direction, i.e., in the second direction opposite to the above described first direction, the plug portion 311 and the remaining portion of the bolt 302 are separated from each other to allow the plug portion 311 to be left behind within the anchor socket 1.

Figure 13:
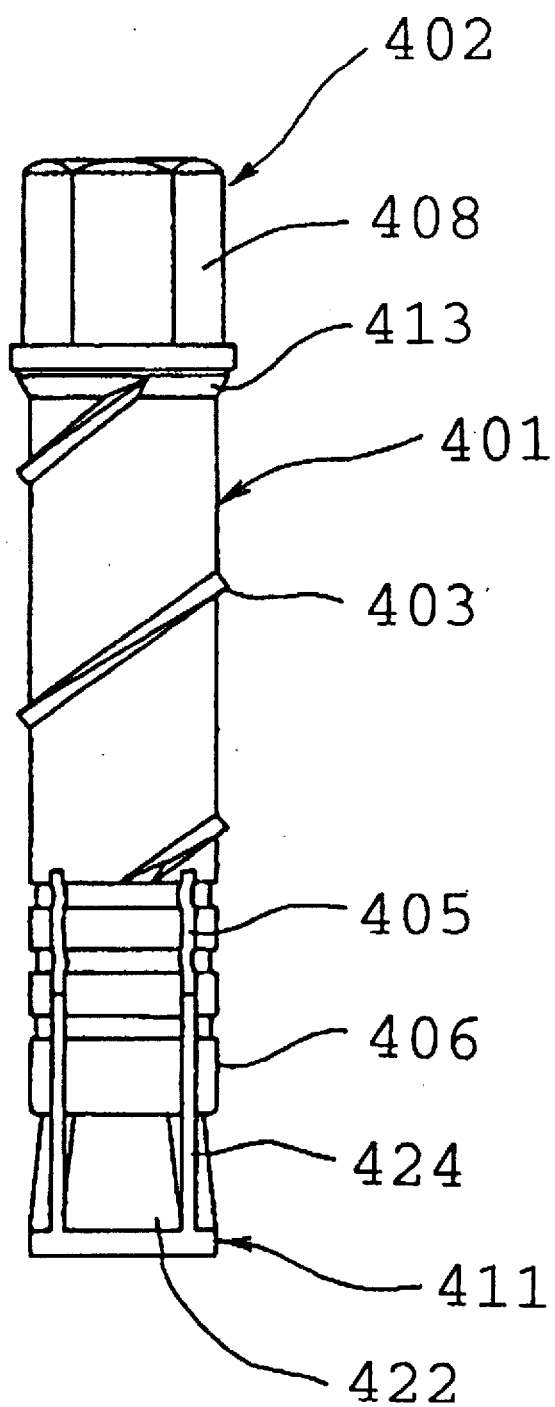
FIG. 13 is an elevational view of an anchor unit according to a further embodiment.
Figure 14A:
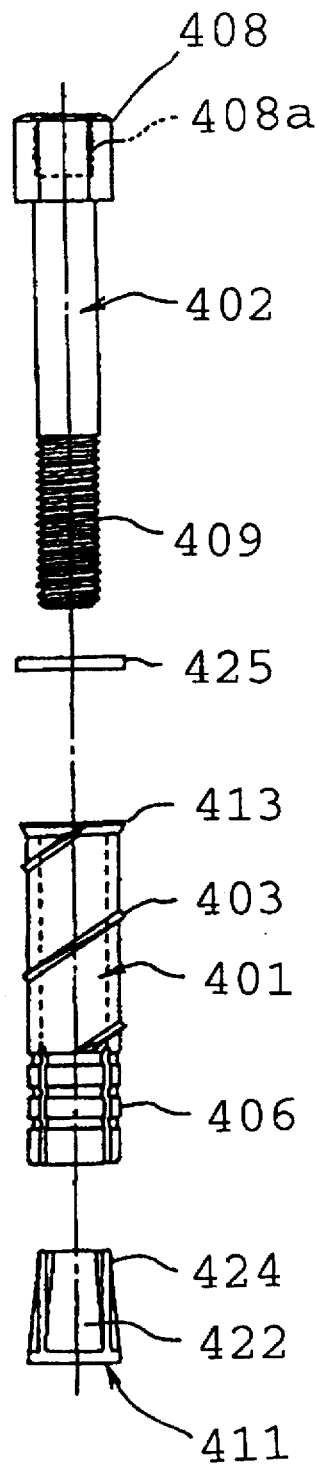
FIG. 14A is an exploded, elevational view of the anchor unit of FIG. 13.
Figure 14B:
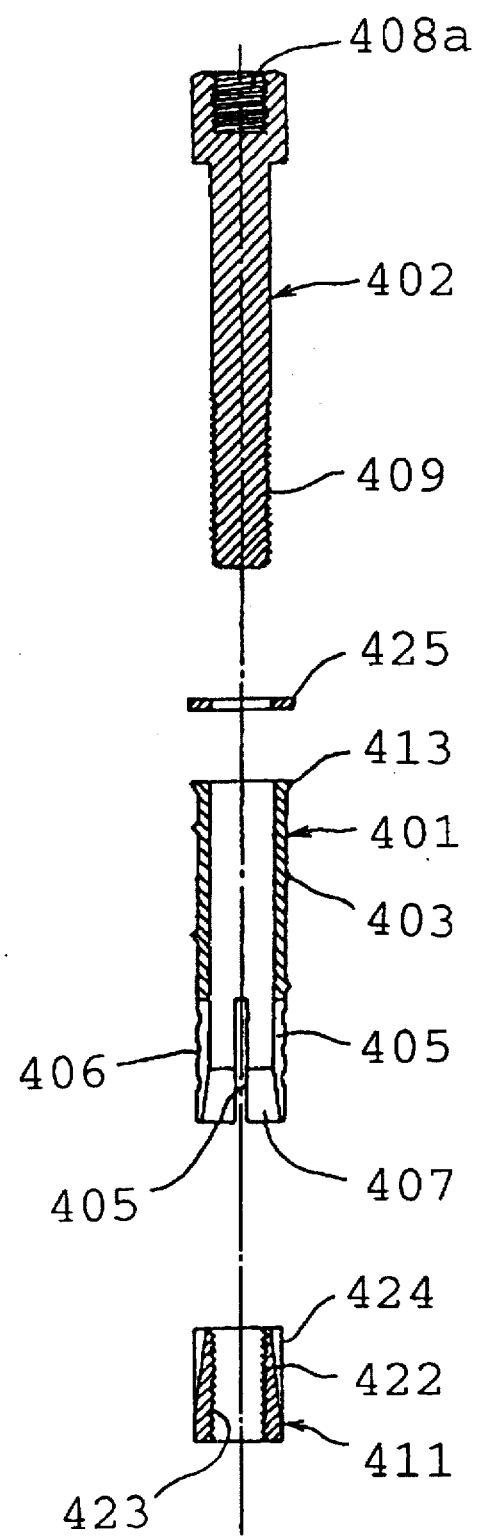
FIG. 14B is an exploded, sectional view of the anchor unit of FIG. 13.
Figure 15:
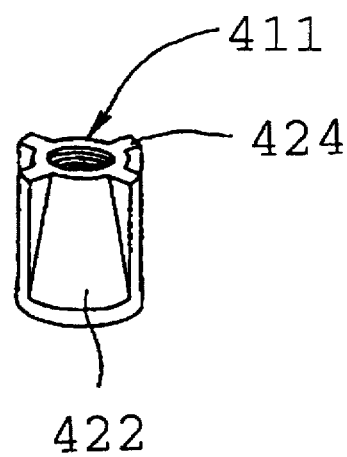
FIG. 15 is a perspective view of a plug which is a constituent part of the anchor unit of FIG. 13.

Referring to FIGS. 13 to 15, a further embodiment will be described. In this embodiment, an anchor unit is made up of an anchor sleeve 401, a bolt 402 passing through the anchor sleeve 401, and a plug 411 screwed onto the bolt 402, i.e., engaged with the bolt 402 by threads.

Figure 16:
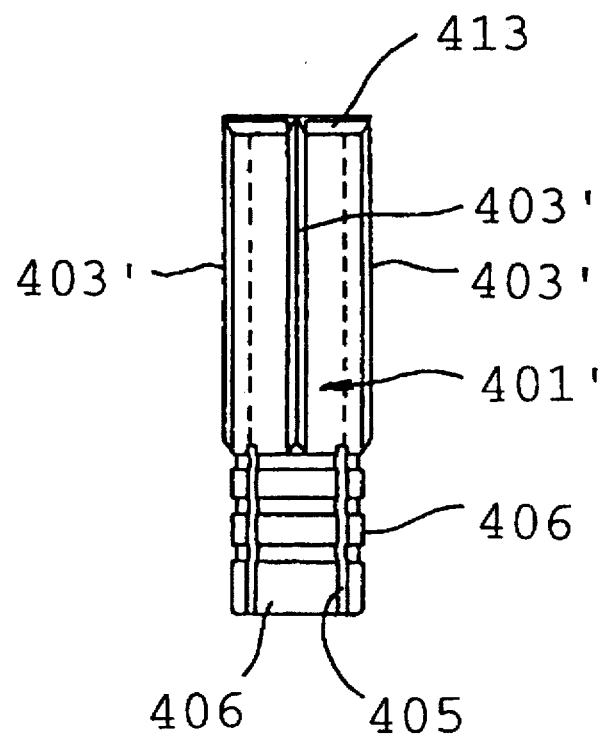
FIG. 16 is an elevational view of an anchor sleeve which is a constituent part of the anchor unit of FIG. 13.

The anchor sleeve 401 has a split end portion 406 formed with a plurality of axial slits 405. The slits 405 are arranged circumferentially of the anchor sleeve 401 and with equal intervals. The split end portion 406 has a tapered inner periphery or hole 407. Similarly to the previous embodiment of FIGS. 1 to 3, the split end portion 406 has a rugged outer periphery so as to be capable of biting into an inner wall of a hole into which the anchor sleeve 401 is inserted, when the split end portion 406 is expanded radially outward. The anchor sleeve 401 further has a helical external rib 403 similarly to the previous embodiment of FIGS. 6A to 6D. In this connection, as shown in FIG. 16, an anchor sleeve 401' may have a plurality of ribs 403' which are elongated axially straightly, similarly to the previous embodiments of FIGS. 1 to 3.

The bolt 402 has a hexagonal bolt head 408 and a threaded end portion 409. The bolt head 408 has an internally threaded recess 408a into which a hanging bolt or the like can be screwed.

The plug 411, as shown in FIG. 15, has a hollow, truncated conic shape and has a conic or tapered outer periphery 422 for contact with the tapered hole 407 of the anchor sleeve 401 and a threaded inner periphery or threaded hole 423 by means of which it is screwed onto the threaded portion 409 of the bolt 402. The plug 411 further has at the outer periphery thereof a plurality of axially elongated projections 424 in the form of keys which are arranged circumferentially thereof and with equal intervals. The projections 424 are engageable in the slits 405 of the anchor sleeve 401 in such a manner as to prevent the plug 411 from turning or rotating relative to the anchor sleeve 401 whilst allowing the plug 411 to be movable axially thereof relative to the anchor sleeve 401.

Figure 17:
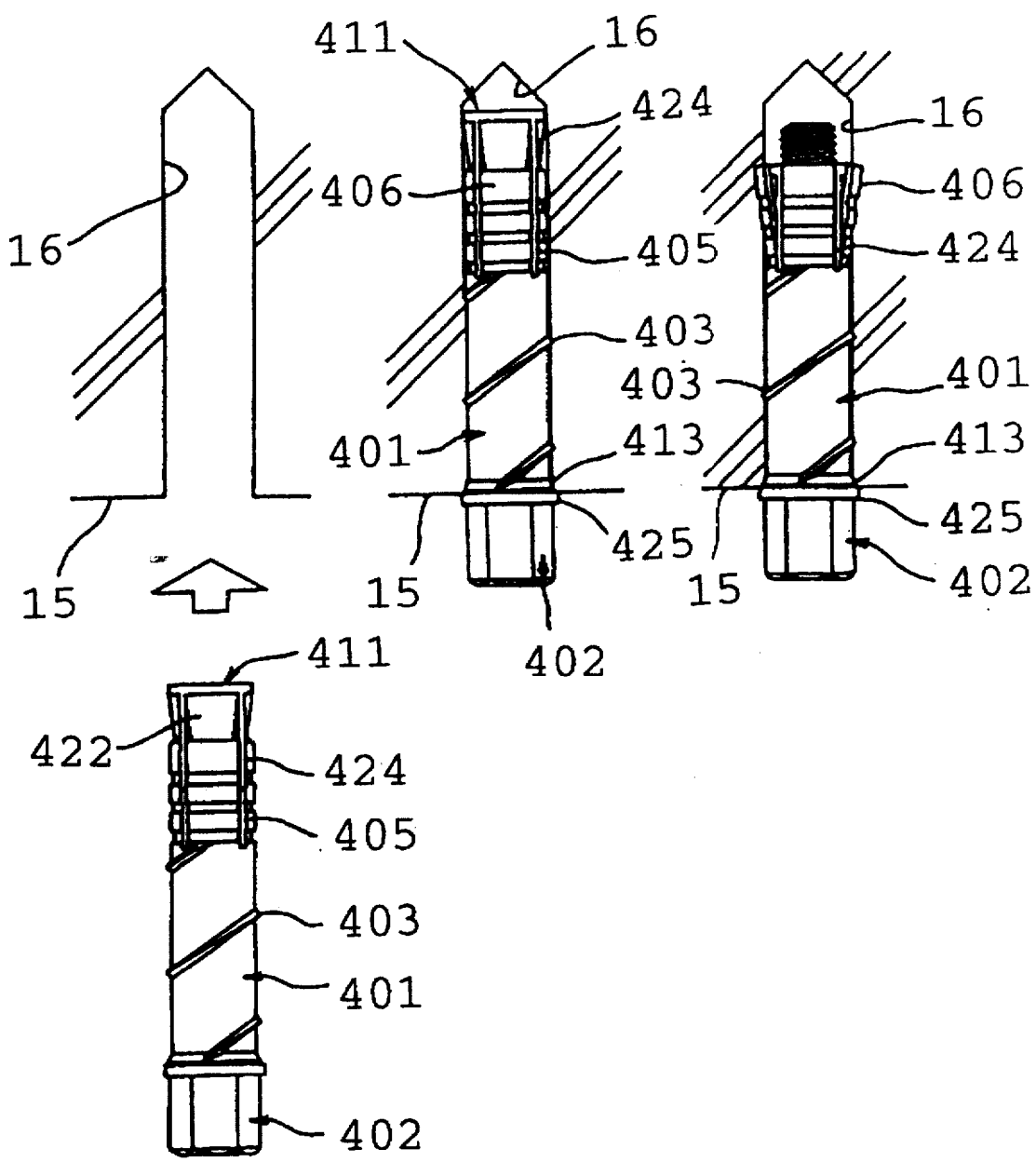
FIGS. 17A to 17C are elevational, partly cutaway views for illustrations of attaching or installing processes of the anchor unit of FIG. 13.

Referring to FIGS. 17A to 17C, attachment or installation of a saddle to a ceiling 15 of a structure by using the anchor unit of this invention and a hanging bolt will be described. Firstly, as shown in FIG. 17A, a hole 16 for installation of the anchor unit of this invention is drilled or otherwise formed in the ceiling 15. Then, as shown in FIG. 17B, the anchor unit of this invention is inserted into the hole 16 by being beaten or struck softly with a hammer or the like. In this instance, the anchor unit is assembled such that the bolt 402 passes through the anchor sleeve 401, with a washer 425 being interposed between the bolt head 408 and the flange 413, and is screwed into the plug 411 to such an extend so as not to cause the split end portion 406 of the anchor sleeve 401 to expand and allow the most part of the plug 411 to be disposed outside of the anchor sleeve 401. The bolt 402 is rotated in a predetermined direction or first direction to be screwed into the anchor sleeve 401, whereby the plug 411 is driven into the split end portion 406 of the anchor sleeve 401 as shown in FIG. 17C since the plug 411 is slidably engaged at the tapered outer periphery 424 with the tapered inner periphery 407 of the anchor sleeve 401 and by the effect of engagement of the external projections 424 in the slits 405. By this, the split end portion 406 of the anchor sleeve 401 is expanded to bite into the inner wall of the hole 16 so that the anchor unit can be held fast to the ceiling 15 without any play therebetween.

Figure 18:
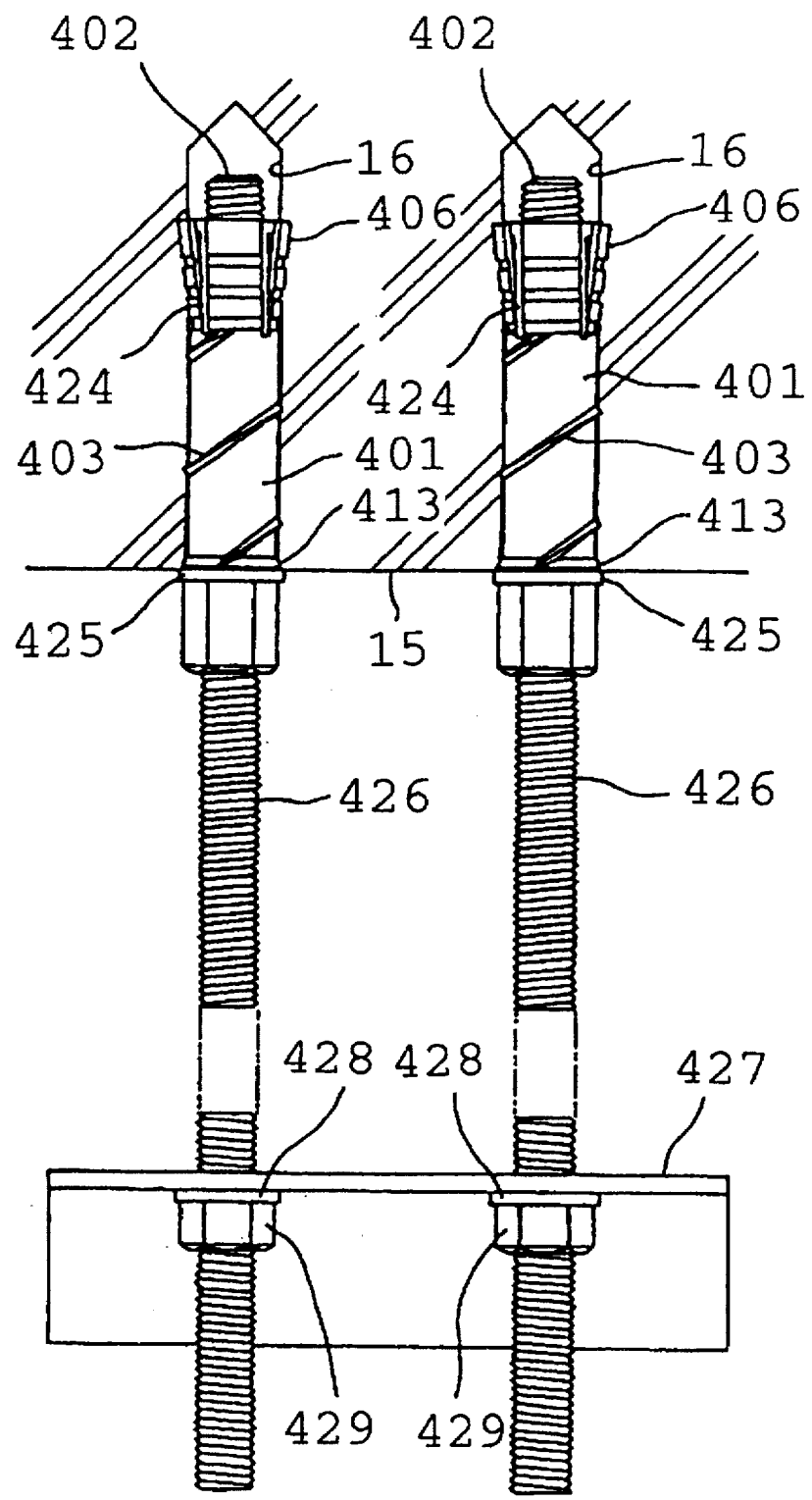
FIG. 18 is a perspective view of a saddle using hanging bolts and the anchor units of FIG. 13.

Accordingly, the anchor sleeve 401 can be held assuredly within the hole 16 of the ceiling 15. Then, as shown in FIG. 18, a hanging bolt 426 of a predetermined length is screwed into the internally threaded recess 408a of each bolt head 408, and a saddle 427 is installed on lower end portions of the hanging bolts 426 and prevented from dropping off therefrom by means of nuts 429 and washers 428.

Figures 19A, 19B, 19C, 19D:
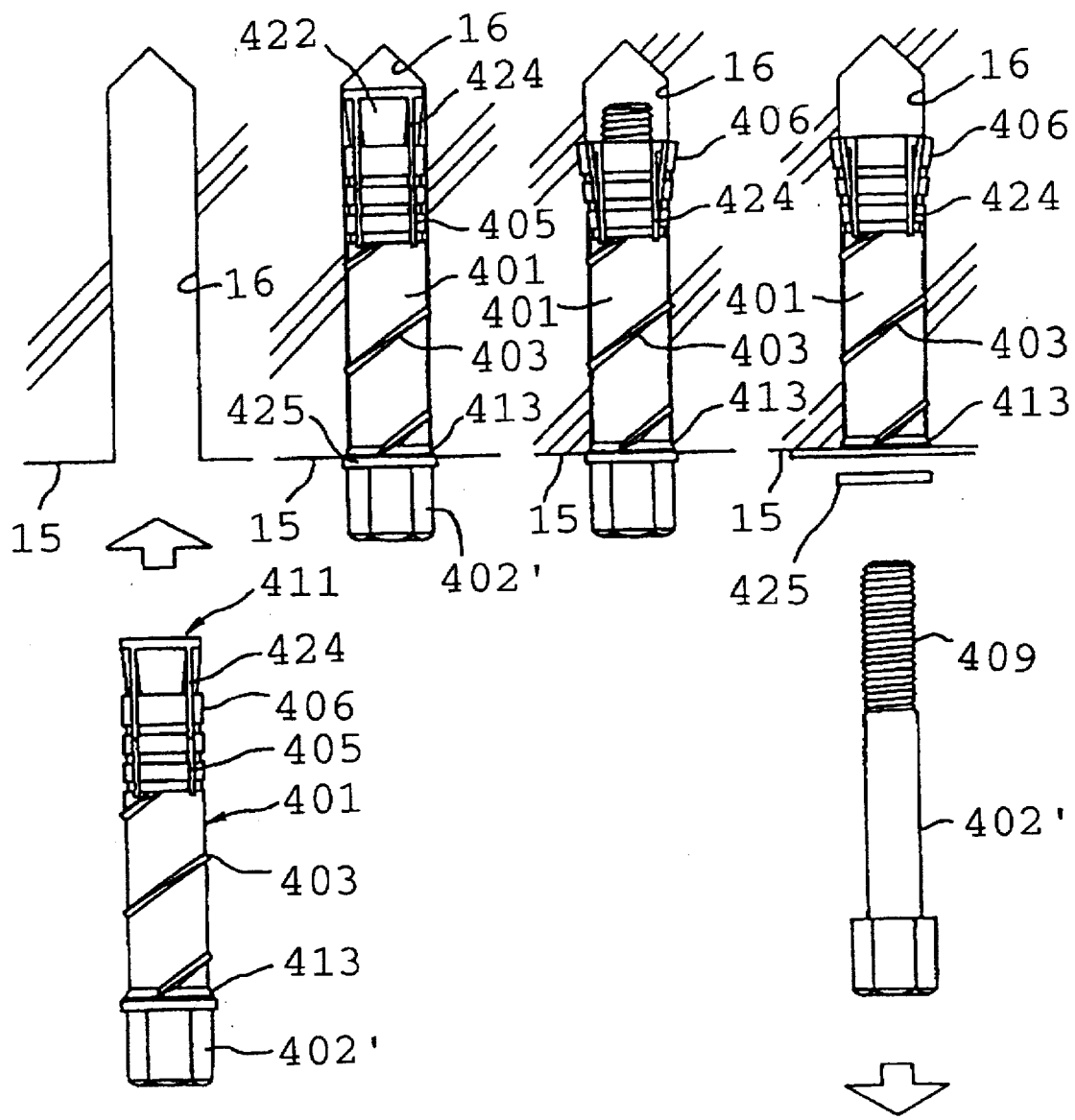
FIGS. 19A to 19D are elevational, partly cutaway and exploded view for illustrations of another operation of the anchor unit of FIG. 13.
Figure 20:
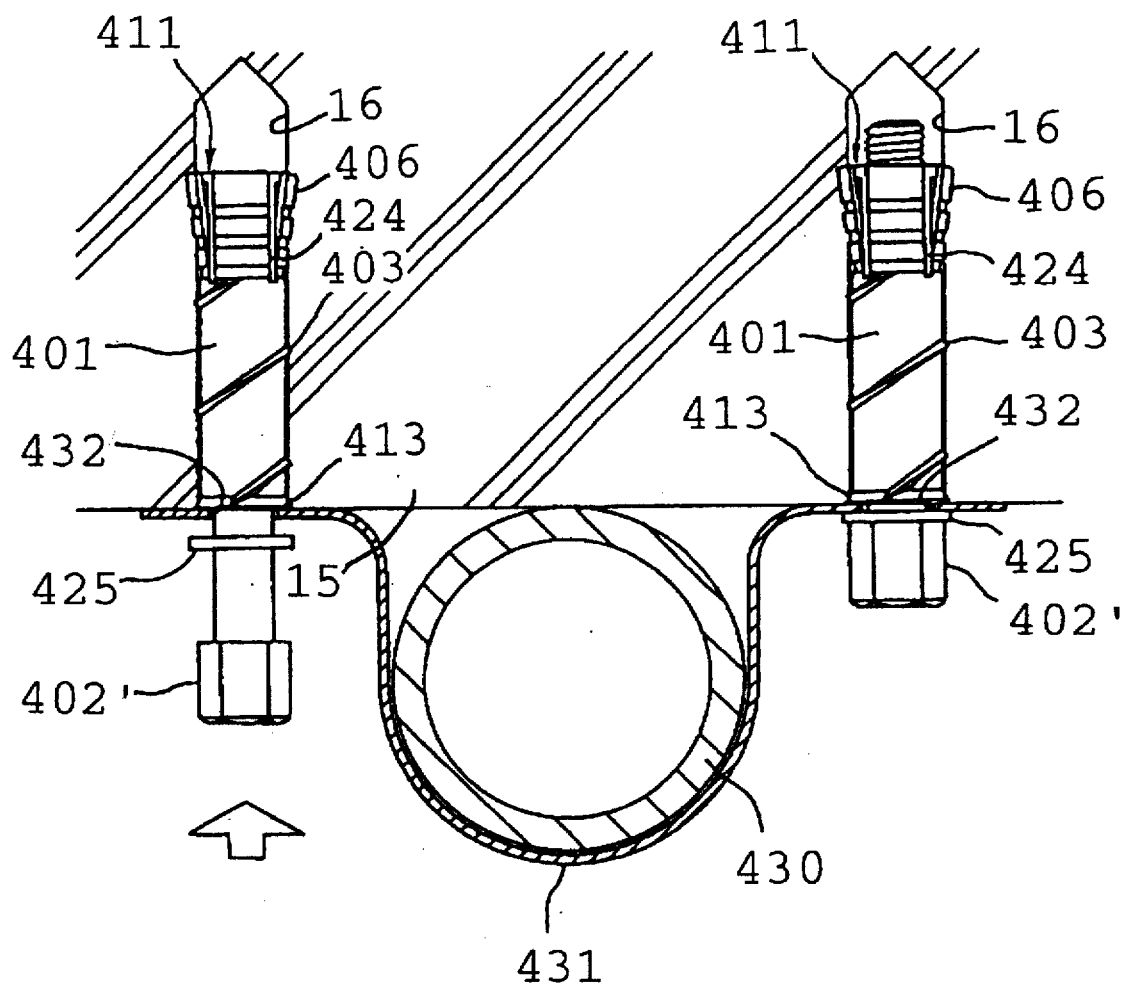
FIG. 20 is an elevational, partly sectioned for illustration of a further operation of the anchor unit of FIG. 13 for securing a pipe to a ceiling.

Referring to FIGS. 19 and 20, in the case of attaching a pipe 430 or the like directly to the ceiling 15 of the structure by using a bracket 431, the anchor unit of this invention is first installed in the hole 16 as shown in FIGS. 19A to 19C in the manner similar to that described with respect to FIGS. 17A to 17C. In this instance, a bolt 402' is of an ordinary kind and is not provided with an internally threaded recess at the bolt head. Then, as shown in FIG. 19D, the bolt 402' is turned or rotated in a reverse direction, i.e., in a direction opposite to the direction to be screwed into the anchor sleeve 401 and is removed from the anchor sleeve 401 and the plug 411. After being made to pass through a hole 432 formed in a flange portion of the bracket 432 and thereby installing thereon the flange portion, the bolt 402' is screwed into the plug 411 once again. In this manner, the bracket 431 can be attached to the ceiling 15 and therefore the pipe 430 can be supported on the ceiling 15 with a large support strength.

Figure 21:
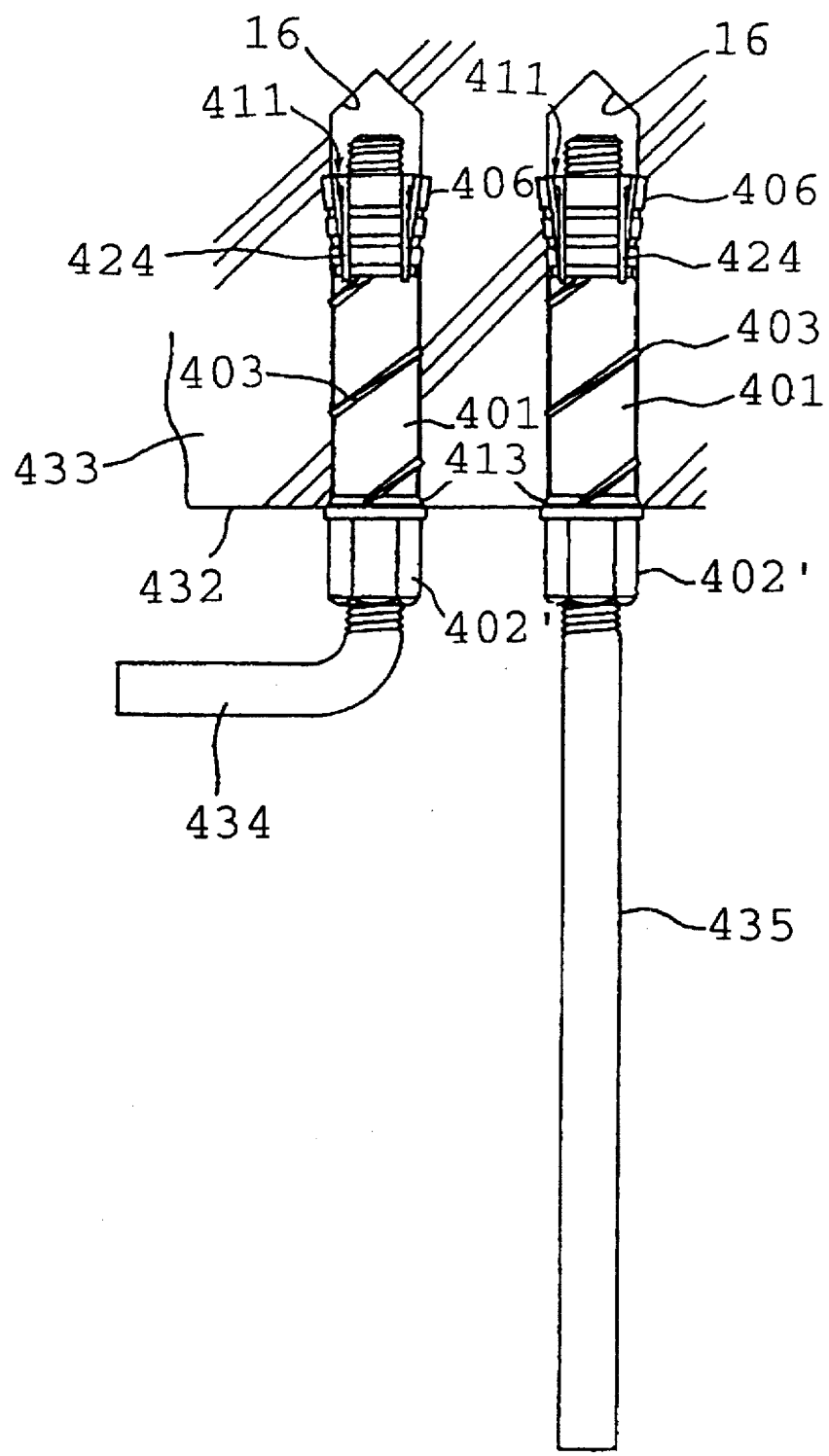
FIG. 21 is an elevational, partly cutaway view for illustration of a further operation of the anchor unit of FIG. 13 for use as a sash anchor and a reinforcement.

Referring to FIG. 21, in the case of installing a sash (not shown) in an opening 432 formed in a wall 433 of a structure, the anchor unit of this invention can be used as a sash anchor by using the bolt 402' having the threaded recess 408a and an L-shaped bolt 434 which is screwed into the threaded recess 408a of the bolt 402' which is fixedly attached to or installed on the wall 433 in the above described manner. In this instance, the sash can be fixedly held in the opening 432 by welding the L-shaped bolt 434 to a hook or the like which is previously provided to a sash frame (not shown). Further, a threaded reinforcement bar 435 can be connected to the bolt head 408 of the anchor unit which is fixedly installed on a concrete slab or a concrete wall, to serve as a reinforcement for an extension floor, wall or the like.

From the foregoing, it will be understood that according to the present invention the split end portion of the anchor socket can be expanded by applying a turning force or torque to the bolt for rotating the bolt in a predetermined direction and the plug portion can be twisted off and left behind within the anchor socket by applying a turning force or twisting force to the bolt for rotating the bolt in the reverse direction, i.e., in the direction opposite to the above described predetermined direction whereby a special tool is not necessitated, which is otherwise necessitated in the prior art device, the anchor unit can be installed on or attached to the wall of a structure, etc. without requiring a large beating or striking force that is inevitably accompanied by large shocks, vibrations and noises but with a rotational force that is attained with a silent work, there is least possibility that the wall is damaged or broken, and therefore the anchor unit of this invention is particularly suited for adoption to the work for attachment or installation of a hardware or metallic part for hanging something on a wall of a structure or for preventing a furniture or a computer or the like business machine from falling within the structure.

It will be further understood that according to the present invention the anchor unit is constructed so that the plug portion, when pushed in by rotating the bolt, is brought into contact the tapered portion of the anchor socket and causes the split end portion to expand and bite into the inner circumferential wall of the hole, whereby the depth of the hole for attachment of the anchor socket is not needed be so accurate but can be comparatively rough, the anchor socket or bolt from the hole can be set to protrude uniformly from the hole irrespective of the depth of the hole, the installation or attachment work can be attained with ease, installation or attachment of the anchor unit can be done so as to attain a high support strength, and the work for checking the anchor unit for the pull-out strength can be dispensed with.

Figure 1:
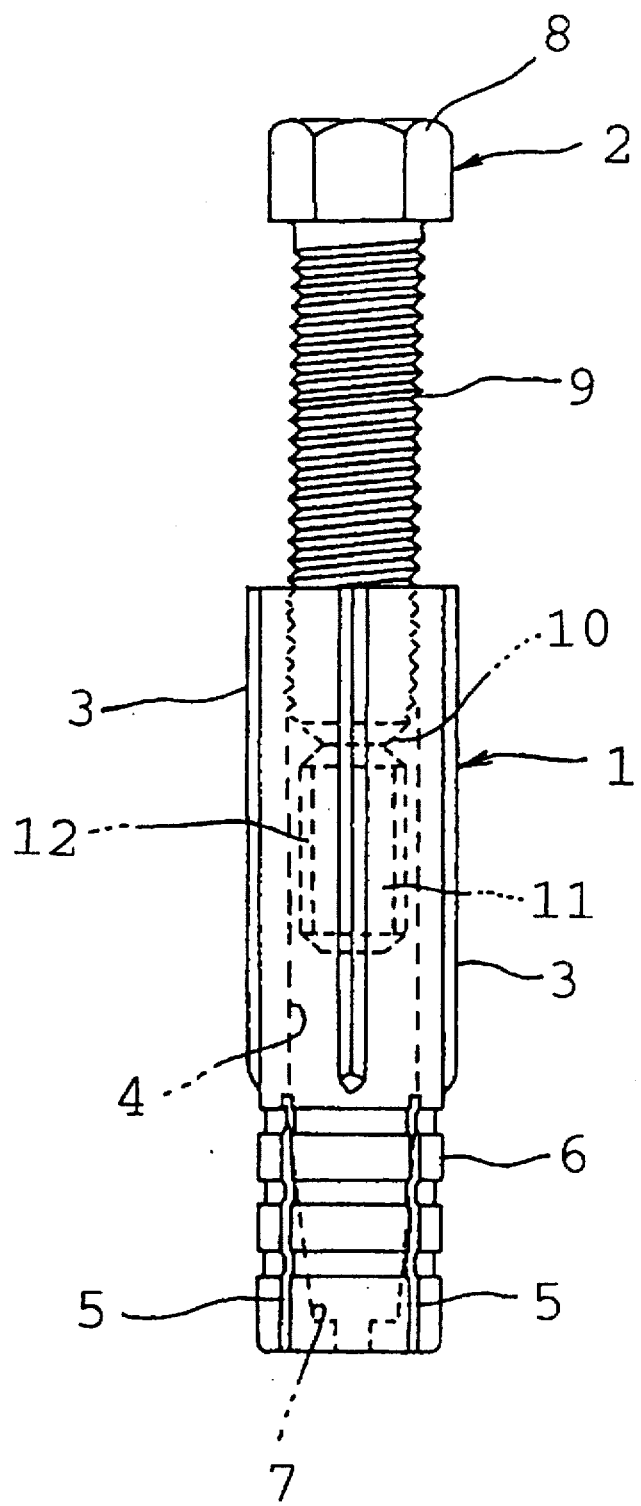
FIG. 1 is an elevational view of an anchor unit according to an embodiment of the present invention.
Figure 3C:
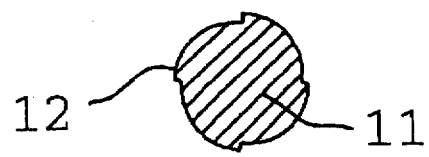
FIG. 3C is a sectional view taken along line 3C—3C in FIG. 3A.

It will be further understood that in the case of the embodiment of FIGS. 1 to 3, the anchor unit can be made up of only two parts, i.e., an anchor socket and a bolt, thus making it possible to reduce the number of necessary parts and therefore the cost since the manufacturing, storage, management of the parts becomes easier.

It will be further understood that according to the present invention the flange portion of the anchor socket is formed with the annular groove and the bolt head is formed with a projection for engagement in the annular groove such that a mark is formed in the annular groove when the split end portion of the anchor socket is expanded desiredly, whereby it can be checked assuredly whether the anchor socket is expanded.

It will be further understood that in the case of the embodiment of FIG. 11, though the number of necessary parts is three, it becomes possible to dispense with the work for twisting off the plug portion from the remaining portion of the bolt, so the work for attachment or installation of the anchor unit can be attained with ease.

What is claimed is:

1. An anchor unit comprising:
    an anchor socket having a threaded hole, an external projection at a peripheral portion around said threaded hole, and a split end portion having a plurality of slits and a tapered hole connected with said threaded hole;

a bolt having at an end an integral plug portion and a threaded portion engaged with said threaded hole of said anchor socket;

said plug portion expanding said split end portion when driven into said tapered hole;

said bolt having an annular groove between said plug portion and said threaded portion, for enabling said plug portion to be twisted off from said remaining portion of said bolt; and ratchet means for allowing said plug portion to be bodily movable with said remaining portion of said bolt and driven into said tapered hole when said bolt is rotated in a first direction to be screwed into said anchor socket and for causing said plug portion to be twisted off from said remaining portion of said bolt and left behind within said tapered hole when said bolt is rotated in a second direction opposite to said first direction.

2. An anchor unit according to claim 1, wherein said ratchet means comprises a ratchet formed on the periphery of said plug portion, which is engageable in said slits of said anchor socket to prevent rotation of said plug portion together with said remaining portion of said bolt when said bolt is rotated in said second direction.

3. An anchor according to claim 1, wherein said plug portion has a polygonal cross section and a plurality of apexes, said ratchet means comprises a ratchet which is formed at said apexes of said plug portion during rotation of said bolt in said first direction, said ratchet being engageable in said slits so as to prevent rotation of said plug portion together with said remaining portion of said bolt when said bolt is rotated in said second direction.

4. An anchor unit according to claim 1, wherein said projection is in the form of a rib.

5. An anchor unit according to claim 4, wherein said rib has a helical shape.

6. An anchor unit according to claim 4, wherein said anchor socket has a plurality of said ribs, said ribs being straight and elongated axially of said anchor socket and arranged in a circular array with equal intervals.

7. An anchor unit according to claim 4, wherein said rib has a nearly triangular cross section.

8. An anchor unit according to claim 1, wherein said anchor socket has a flange at an end opposite to said split end portion.

9. An anchor unit according to claim 8, wherein said flange of said anchor socket is formed with an annular recess, and said bolt has a bolt head having a projection which is brought into contact with a bottom of said annular recess when said bolt is screwed a predetermined amount into said anchor socket.

10. An anchor unit according to claim 1, wherein said bolt has a bolt head which is formed with an internally threaded recess.

11. An anchor unit comprising:

an anchor socket having a threaded hole, an external projection at a peripheral portion around said threaded hole, and a slit end portion having a plurality of slits and a tapered hole connected with the threaded hole; and a bolt having at an end an integral, nearly cylindrical plug portion and a threaded portion engaged with said threaded hole of said anchor socket, said plug portion expanding said split end portion when driven into said tapered hole;

wherein said bolt has a reduced diameter portion between said plug portion and said threaded portion for enabling said plug portion to be twisted off from a remaining portion of said bolt and said plug portion has on the periphery thereof a ratchet for allowing said plug portion to be bodily movable with a remaining portion of said bolt and be driven into said tapered hole when said bolt is rotated in a first direction to be screwed into said anchor socket and for causing said plug portion to be twisted off from said remaining portion of said bolt and left behind within said tapered hole when said bolt is rotated in a second direction opposite to said first direction.

12. An anchor unit according to claim 11, wherein said anchor socket has a flange at an end opposite to said split end, said flange of said anchor socket being formed with an annular recess, and said bolt has a bolt head having a projection which is brought into contact with a bottom of said annular recess when said bolt is screwed a predetermined amount into said anchor socket.

13. An anchor unit according to claim 11, wherein said bolt has a bolt head which is formed with an internally threaded recess.

14. An anchor unit comprising:

an anchor socket having a threaded hole, and external projection at a peripheral portion around said threaded hole, and a split end portion having a plurality of slits and a tapered hole connected with said threaded hole;

a bolt having at an end an integral plug portion which is generally uniform in cross section and a threaded portion engaged with said threaded hole of said anchor socket, said plug portion expanding said split end portion when driven into said tapered hole;

wherein said bolt has a reduced diameter portion between said plug portion and said threaded portion, for enabling said plug portion to be twisted off from a remaining portion of said bolt, and said plug portion has a polygonal cross section and formed with a ratchet at apexes thereof during rotation of said bolt in said first direction, said ratchet being engageable in said slits so as to prevent rotation of said plug portion together with said remaining portion of said bolt when said bolt is rotated in said second direction.

15. An anchor unit according to claim 14, wherein said anchor socket has a flange at an end opposite to said split end, said flange of said anchor socket being formed with an annular recess, and said bolt has a bolt head having a projection which is brought into contact with a bottom of said annular recess when said bolt is screwed a predetermined amount into said anchor socket.

16. An anchor unit according to claim 14, wherein said bolt has a bolt head which is formed with an internally threaded recess.

17. An anchor unit comprising:

an anchor socket having a threaded hole, an external projection at a peripheral portion around said thread hole, and a split end portion having a plurality of slits and a tapered hole connected with said threaded hole; and a bolt having at an end a plug portion independent from a remaining portion thereof and a threaded portion engaged with said threaded hole of said anchor socket, said plug portion expanding said split end portion when forced into said tapered hole;

wherein said plug portion and said remaining portion of said bolt are independent from each other and drivingly connected at mating ends thereof in such a manner as to enable said plug portion to be driven into said tapered hole while rotating together with said remaining portion of said bolt when said bolt is rotated in a first direction to be screwed into said anchor socket and to be separated from said remaining portion of said bolt and left behind within said tapered hole when said bolt is rotated in a second direction opposite to said first direction, each of said mating ends of said plug portion and said remaining portion of said bolt including a planar surface section perpendicular to a center axis of said bolt and a helical surface section inclined relative to said planar surface section so as to form a shoulder therebetween.

* * * * *